US012472959B1

United States Patent
Felch et al.

(10) Patent No.: US 12,472,959 B1
(45) Date of Patent: Nov. 18, 2025

(54) ARCHITECTURE FOR ALTERNATIVE MEANS TO SHIFT IN AND OUT OF PARK

(71) Applicant: Ford Global Technologies, LLC, Dearborn, MI (US)

(72) Inventors: Harold John Felch, Novi, MI (US); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/953,831

(22) Filed: Nov. 20, 2024

(51) Int. Cl.
    *B60W 50/02* (2012.01)
    *B60T 1/00* (2006.01)
    *B60W 50/08* (2020.01)

(52) U.S. Cl.
    CPC ......... *B60W 50/0225* (2013.01); *B60T 1/005* (2013.01); *B60W 50/08* (2013.01); *B60W 2510/186* (2013.01); *B60W 2540/12* (2013.01); *B60W 2710/186* (2013.01)

(58) Field of Classification Search
    CPC ..... F16H 2061/1232; F16H 2061/1256; F16H 2061/1272; F16H 2061/1288; F16H 2061/0481; F16H 2061/0488; F16H 61/12; B60T 1/005; B60W 50/0225; B60W 50/08; B60W 2510/186; B60W 2540/12; B60W 2710/186
See application file for complete search history.

(56) References Cited

U.S. PATENT DOCUMENTS

| | | |
|---|---|---|
| 3,710,908 A | 1/1973 | Muir |
| 9,415,758 B2 | 8/2016 | Drumm et al. |
| 10,128,780 B2 | 11/2018 | Crisp et al. |
| 11,052,891 B2 | 7/2021 | Niepelt et al. |
| 2011/0226569 A1 | 9/2011 | Devlieg |
| 2013/0268171 A1* | 10/2013 | Huls ........................ B60T 1/062 701/70 |
| 2018/0023699 A1* | 1/2018 | Fujiwara ................ F16H 61/12 701/58 |
| 2023/0383836 A1* | 11/2023 | Gudapati ................ F16H 59/08 |
| 2024/0208468 A1* | 6/2024 | Gomez ................ B60W 50/10 |

* cited by examiner

*Primary Examiner* — Lori Wu
(74) *Attorney, Agent, or Firm* — Burr & Forman; Lorne Forsythe (57) ABSTRACT

A control system includes a braking system operably coupled to a wheel assembly to apply braking force when actuated responsive to operation of a brake pedal, a propulsion system to apply positive torque for propulsion responsive to operation of an accelerator pedal, and a gear selector to select an operating state of the vehicle when the gear selector is in an unfaulted state. The operating state is a selected one of park and drive states. The braking system applies a holding force in the park state and the propulsion system enables application of the positive torque in the drive state. The control system further includes a park status backup controller that detects actuation of the brake pedal, and receives information indicative of a fault state of the gear selector. In response to receiving an activation pattern during the fault state, the park status backup controller generates an operating state change instruction.

20 Claims, 5 Drawing Sheets

Activation Table

| Activation Pattern | Fault State | Status | Result |
|---|---|---|---|
| Y | Y | Park | Drive |
| Y | Y | Drive/ Neutral | Park |
| Y | N | Any | Apply Brake |
| N | Y | Any | Apply Brake |

ARCHITECTURE FOR ALTERNATIVE MEANS TO SHIFT IN AND OUT OF PARK

TECHNICAL FIELD

Example embodiments generally relate to vehicle control systems and, more particularly, relate to a system that provides alternative way to shift into and out of park in response to a loss of operability of a gear selection module.

BACKGROUND

In most vehicles with automatic transmissions, a gear selector or gear selection module is used to shift the vehicle between various operating modes or gears. For example, drive, park, reverse and neutral are common modes that can be selected via the gear selector or gear selection module. In drive, the drive train is engaged to provide positive torque to the wheel assembly of the vehicle in order to propel the vehicle forward. In reverse, the direction is changed, but the engagement of the drive train is similar. In park by brake systems that lack a park pawl, the drive train is disengaged, and brake system components apply braking forces to hold the vehicle in place when in park. In neutral, braking forces are not applied and the drive train is disengaged.

If a vehicle were to have a faulted gear selection module (e.g., a faulted park switch in the gear selection module), a strategy would need to be employed to avoid leaving the vehicle in a disabled or unsecured state. In order to prevent any such outcome, the typical response might be to provide one or more levels of redundancy in the gear selection module by virtue of either providing a redundant module or providing redundant wiring or other componentry within the module.

Thus, it may be desirable to provide a simpler, and more efficient solution. For example, it may be desirable to develop an architecture that provides an ability to ensure alternative shifting capability into and out of park without complicated wiring strategies and component architectural designs.

BRIEF SUMMARY OF SOME EXAMPLES

In accordance with an example embodiment, a vehicle control system may be provided. The vehicle control system may include a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state. The operating state may be a selected one of a group of states including a park state and a drive state. The braking system may apply a holding force to the wheel assembly in the park state and the propulsion system enabling application of the positive torque for propulsion in the drive state. The vehicle control system may further include a park status backup controller operably coupled to the brake pedal to detect actuation of the brake pedal, and operably coupled to the gear selector to receive information indicative of a fault state of the gear selector. In response to receiving an activation pattern during the fault state, the park status backup controller may generate an operating state change instruction.

In another example embodiment, park status backup controller of a vehicle control system may be provided. The vehicle control system may include a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state. The operating state may be a selected one of a group of states including a park state and a drive state. The braking system may apply a holding force to the wheel assembly in the park state and the propulsion system enabling application of the positive torque for propulsion in the drive state. The park status backup controller may be operably coupled to the brake pedal to detect actuation of the brake pedal, and operably coupled to the gear selector to receive information indicative of a fault state of the gear selector. The park status backup controller may include processing circuitry configured to determine whether the gear selector is in the fault state, determine whether an activation pattern is received with respect to actuation of the brake pedal, and, in response to receiving the activation pattern during the fault state, generating an operating state change instruction.

In another example embodiment, a method of providing backup park status functionality is provided. The method may be practiced in a vehicle that includes a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state. The operating state may be a selected one of a group of states including a park state and a drive state. The braking system may apply a holding force to the wheel assembly in the park state and the propulsion system enabling application of the positive torque for propulsion in the drive state. The park status backup controller may be operably coupled to the brake pedal to detect actuation of the brake pedal, and operably coupled to the gear selector to receive information indicative of a fault state of the gear selector. The method may include determining whether the gear selector is in the fault state, determining whether an activation pattern is received with respect to actuation of the brake pedal, and, in response to receiving the activation pattern during the fault state, generating an operating state change instruction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about," "approximately" and "substantially," when used to refer to variability of parameters, should be understood to be definite approximations that account for variations in measurements that cannot be, or as one of skill in the art would appreciate, normally are not, measured precisely. Thus, for example, a parameter that is "about," "approximately" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Figure 1:
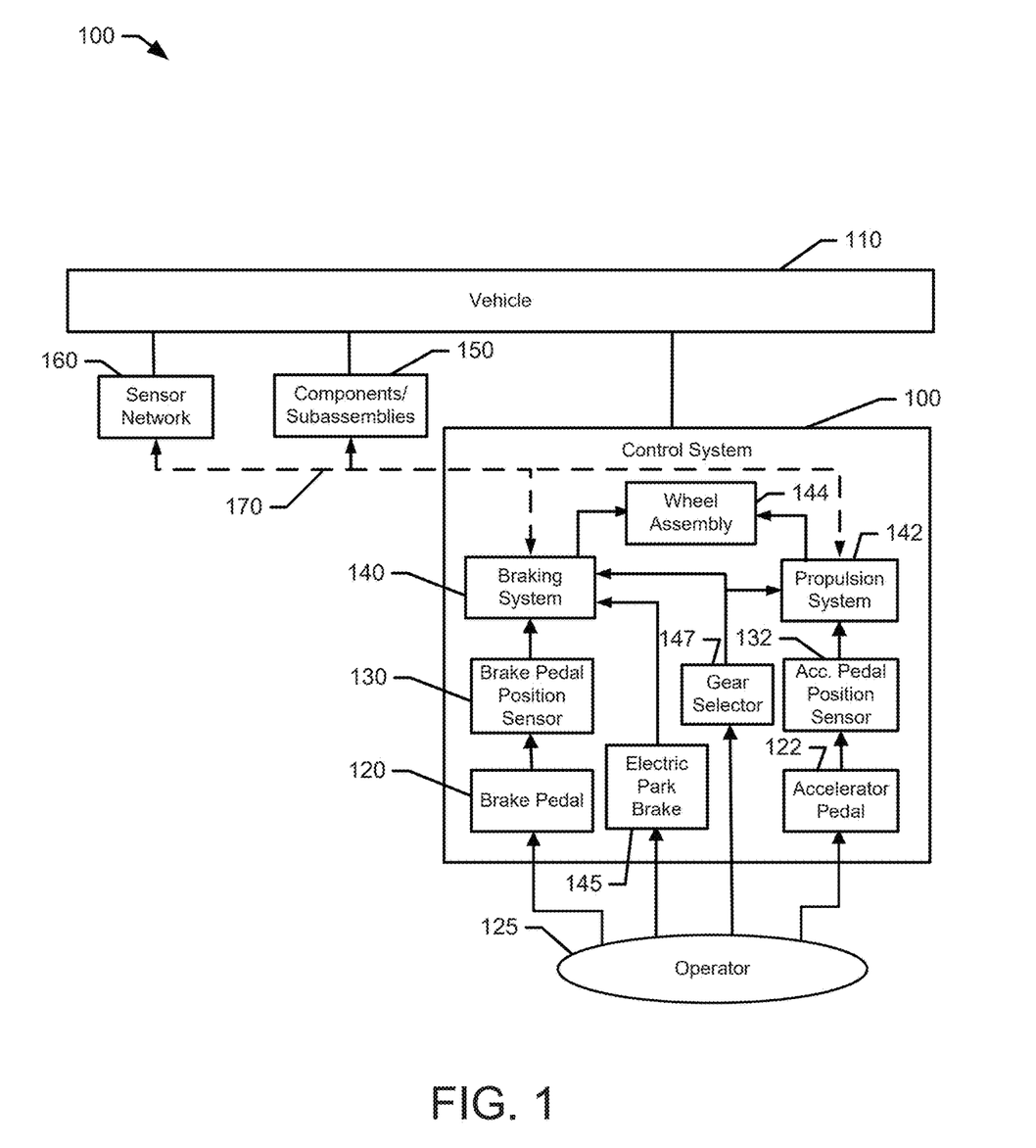
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 and an accelerator pedal 122 (or gas pedal). However, the control pedals could alternatively be hand operated or any other operable member via which an operator 125 may provide an input indicative of an intent of the operator relative to controlling net torque for application to the wheels of the vehicle 110.

The control system 100 may also include position sensors for each of the brake pedal 120 (which may have a corresponding brake pedal position sensor 130) and the accelerator pedal 122 (which may have a corresponding accelerator pedal position sensor 132). The brake pedal position sensor 130 and the accelerator pedal position sensor 132 may provide data indicative of the precise or approximate position of the brake pedal 120 and the accelerator pedal 122, respectively. The data indicative of pedal position may then be provided to respective ones of a braking system 140 and a propulsion system 142, which may include components that provide for braking torque application and propulsion torque application, respectively. The braking and propulsion systems 140 and 142 may be configured to determine individual inputs of negative and positive torque (e.g., net torque) as described herein based on inputs from the brake pedal position sensor 130, the accelerator pedal position sensor 132, or other components of the vehicle 110. In some cases, the control system 100 may be configured to perform other tasks related or not related to propulsive and braking control or performance management.

In some embodiments, the control system 100 may further include an electric park brake 145 and a gear selector 147. The electric park brake 145 may be operable by the operator 125 via a button, lever, pedal, or other actuator disposed in the cabin of the vehicle 110 and accessible to the operator 125. When actuated, the electric park brake 145 may provide an input to the braking system 140 that causes the braking system 140 to apply braking torque to the wheels of the vehicle 110 to hold the vehicle 110, particularly on an incline or hill. Meanwhile, the gear selector 147 (which could be a gear shifter for a manual transmission) may operate to engage the output shaft(s) to the propulsion system 142 in a corresponding selected or desired gear or direction. Thus, for example, the propulsion system 142 applies propulsive torque in the forward direction when the gear selector 147 is positioned in drive or one of the drive gears. However, the propulsion system 142 applies propulsive torque in the rearward direction when the gear selector 147 is positioned in reverse. Meanwhile, when the gear selector 147 is placed in park, no propulsive torque may be requested to or provided from the propulsion system 142 and instead, a braking force may be applied by the braking system 140. When the gear selector 147 is placed in neutral, no propulsive torque may be requested to or provided from the propulsion system 142 and also no braking force may be applied by the braking system 140 (at least by virtue of the position of the gear selector 147, although the brake pedal 120 can still be used to apply braking force). In some cases the electric park brake 145 may be activated or ready for activation by the operator 125 when the gear selector 147 is placed in park.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170.

The components or subassemblies 150 may include, for example, components of the braking system 140, the propulsion system 142 and/or a wheel assembly 144 of the vehicle 110 among other components/subassemblies. The braking system 140 may be structured to provide braking inputs to braking components of the vehicle 110 (e.g., electro-mechanical brakes, hydraulic brakes, regenerative brakes, etc.) based on a braking torque determined by a torque control module. The braking system 140 may also include more than one type of braking hardware. For example, the braking system 140 of the vehicle 110 may include a combination of hydraulic brakes and electromechanical brakes. In an example embodiment, the braking system 140 may be a brake-by-wire system, may employ regenerative braking, or any other suitable type of brake system.

The propulsion system 142 may include a gas engine, electric motor, or any other suitable propulsion device. In some cases, the propulsion system 142 may also incorporate drive-by-wire components and a corresponding control paradigm. Thus, the vehicle 110 (using the braking system 140 and the propulsion system 142) may determine either or both of propulsive and braking torque inputs for provision to the propulsion system 142 and braking system 140 to apply the respective form of positive or negative torque to the wheels of the wheel assembly 144 of the vehicle 110. Moreover, one or more corresponding sensors of the sensor network 160 that may be operably coupled to the brake assembly and/or the wheel assembly 144 may provide information relating to brake torque, brake torque rate, vehicle velocity, rate of change of vehicle velocity, front/rear wheel speeds, vehicle pitch, etc.

Accordingly, for example, the control system 100 may be able to receive numerous different parameters, indications and other information that may be related to or indicative of different situations or conditions associated with vehicle status. The control system 100 may also receive information indicative of the intent of the operator 125 (or autonomous control system) relative to control of various aspects of operation of the vehicle 110 and then be configured to use the information received to provide instructions to the braking system 140 and the propulsion system 142 in order to control application of net torque to the wheels of the wheel assembly 144 of the vehicle 110. The control system 100 of FIG. 1 may be similar to conventional systems in many respects, except that, the control system 100 (and in some cases specifically the gear selector 147) may be modified to enable alternate operation for shifting into the park mode or status via a park status backup controller 240 as described in greater detail in reference to FIGS. 2-4.

Figure 2:
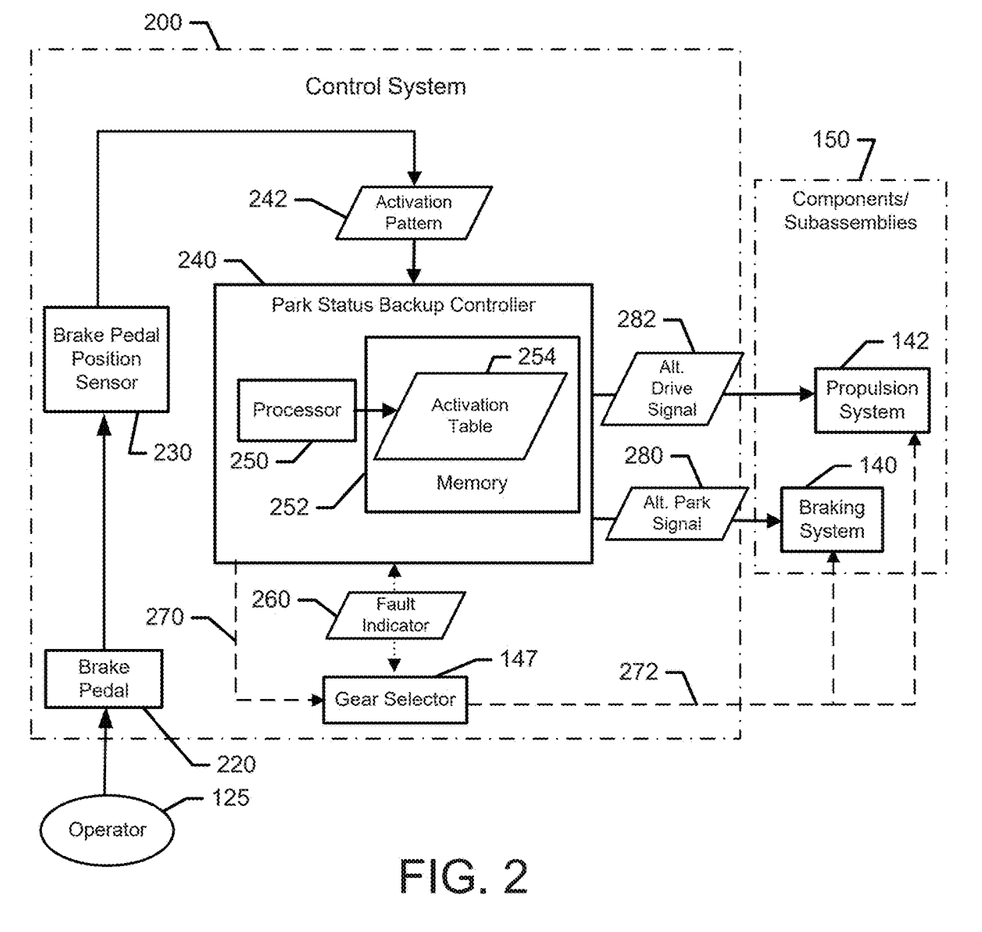
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates example interactions for the control system 200 between a brake pedal 220 (e.g., an example of brake pedal 120 of FIG. 1), a brake pedal position sensor 230 (e.g., an example of brake pedal position sensor 130 of FIG. 1), a park status backup controller 240 (e.g., which generates commands or instructions as described herein) and the components or subassemblies 150 relative to information received thereby (e.g., from the sensor network 160, from various ones of the components/subassemblies 150, and/or from the operator 125).

The control system 200 may be enabled to monitor the brake pedal 220 to enable the park status backup controller 240 to determine whether an activation pattern 242 is received from the brake pedal 220. Although not required, the park status backup controller 240 may monitor the brake pedal 220 via input from the corresponding brake pedal position sensor 230. In this regard, for example, the brake pedal position sensor 230 may indicate when the brake pedal 220 is actuated by the operator 125 at least a predetermined amount, and provide an indication to the park status backup controller 240 to indicate the corresponding actuation.

The park status backup controller 240 may include processing circuitry (e.g., a processor 250 and memory 252) that monitors actuations of the brake pedal 220 to determine if the actuations are provided by the operator 125 in such a way as to correspond to the activation pattern 242. If the activation pattern 242 is detected, then it can typically be inferred that the operator 125 is intending to initiate the functionality of the park status backup controller 240. However, in an example embodiment, the park status backup controller 240 may be prevented from performing its function, or may otherwise not perform its function, unless a further enabling signal is received to enable the park status backup controller 240 to process or generate a response to the activation pattern 242. The enabling signal may, in some cases, take the form of a fault indicator 260. However, in some cases, the enabling signal may include multiple signals or indications and, for example, one indication that may be required for the enabling signal may be an indication from the sensor network 160 to indicate that the vehicle 110 is not moving.

In some embodiments, the gear selector 147 may provide the fault indicator to the park status backup controller 240 in response to a fault occurring at the gear selector 147, which inhibits or prevents functioning of the gear selector 147. However, in some cases, the park status backup controller 240 may query the gear selector 147 regarding operation of the gear selector 147 and when the gear selector 147 does not respond to the query (either properly or at all), the lack of a response or proper response may be experienced by the park status backup controller 240 as the fault indicator 260 indicating a fault with the gear selector 147. In an example embodiment, the park status backup controller 240 may only act on receipt of the activation pattern 242, during a period when the fault indicator 260 is actively indicating the fault status of the gear selector 147. However, as noted above, other enabling features may include vehicle speed being zero, as determined by the sensor network 160.

In response to receipt of the activation pattern 242 while the fault indicator 260 indicates the fault status of the gear selector 147, the park status backup controller 240 may be configured to generate an operating state change instruction 270. The operating state change instruction 270 may indicate a change from the current state of the vehicle 110 to another state as described in greater detail below. In some cases, the operating state change instruction 270 may indicate to the gear selector 147 a state change that may be forced through to the braking system 140 and/or the propulsion system 142 as instruction 272. However, in other cases, the park status backup controller 240 may directly provide instructions to the propulsion system 142 and/or the braking system 140 in the form of an alternate drive (or reverse) signal 282 and/or an alternate park signal 280, respectively. In such examples, the alternate drive (or reverse) signal 282 and an alternate park signal 280 may combine to form an example of the operating state change instruction 270, or each may individually be an example of the operating state change instruction 270.

Figure 3:
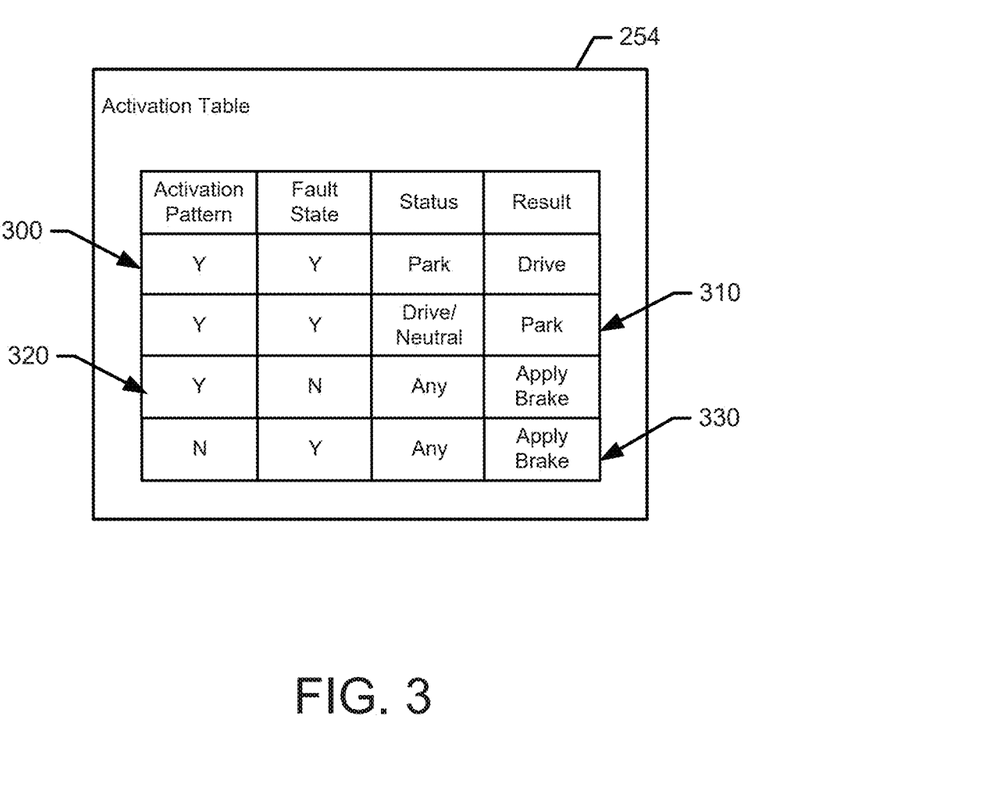
FIG. 3 illustrates an activation table in accordance with an example embodiment.

In some cases, the processor 250 and memory 252 of the operating state change instruction 270 may execute the functionality of the park status backup controller 240 in the form of an application or software instruction execution. In this regard, for example, the memory 252 may store an activation table 254, which may define various inputs and corresponding outputs that are to be executed in response to the inputs. FIG. 3 illustrates an example of the activation table 254. Referring to FIG. 3, line 300 in the activation table 254 indicates that if the activation pattern is received while the fault state is also present (as indicated by the Y symbol for "yes" in each respective column), then if the current state of the vehicle is "park" or the park state, then the result (i.e., the operating state change instruction 270) will be to shift the vehicle 110 to the drive state ("drive"). Similarly, line 310 in the activation table 254 indicates that if the activation pattern is received while the fault state is also present, then if the current state of the vehicle is "drive" or the drive state, then the result (i.e., the operating state change instruction 270) will be to shift the vehicle 110 to the park state ("park"). The same operation may apply to an initial state of neutral or reverse.

Meanwhile, as shown in line 320, if the fault state is not present, and the gear selector 147 is therefore unfaulted (as indicated by the N symbol for "no" in the fault state column), then regardless of status, the result of applying the brake pedal may be to apply braking forces normally. However, another result could be defined in other cases. Similarly, even if the fault state is present, if there is no receipt of the activation pattern, then the result of applying the brake pedal may be to apply braking forces normally. Other table entries may be included in other example tables, and other outcomes may also be defined. The activation table 254 is therefore merely presented to show how one example embodiment may operate.

In an example embodiment, different patterns of applications of the brake pedal 220 could be used to toggle between different states. For example, the operator 125 may toggle between park and neutral as well as park to drive or park to reverse. In one example architecture, five quick taps of the brake pedal 220 may transition to park from drive, reverse or neutral. Meanwhile, if you start in park, five quick taps (or applications) of the brake pedal 220 may transition to neutral, whereas seven quick taps transition to drive and nine quick taps transition to reverse. Other combinations may also be possible.

Figure 4:
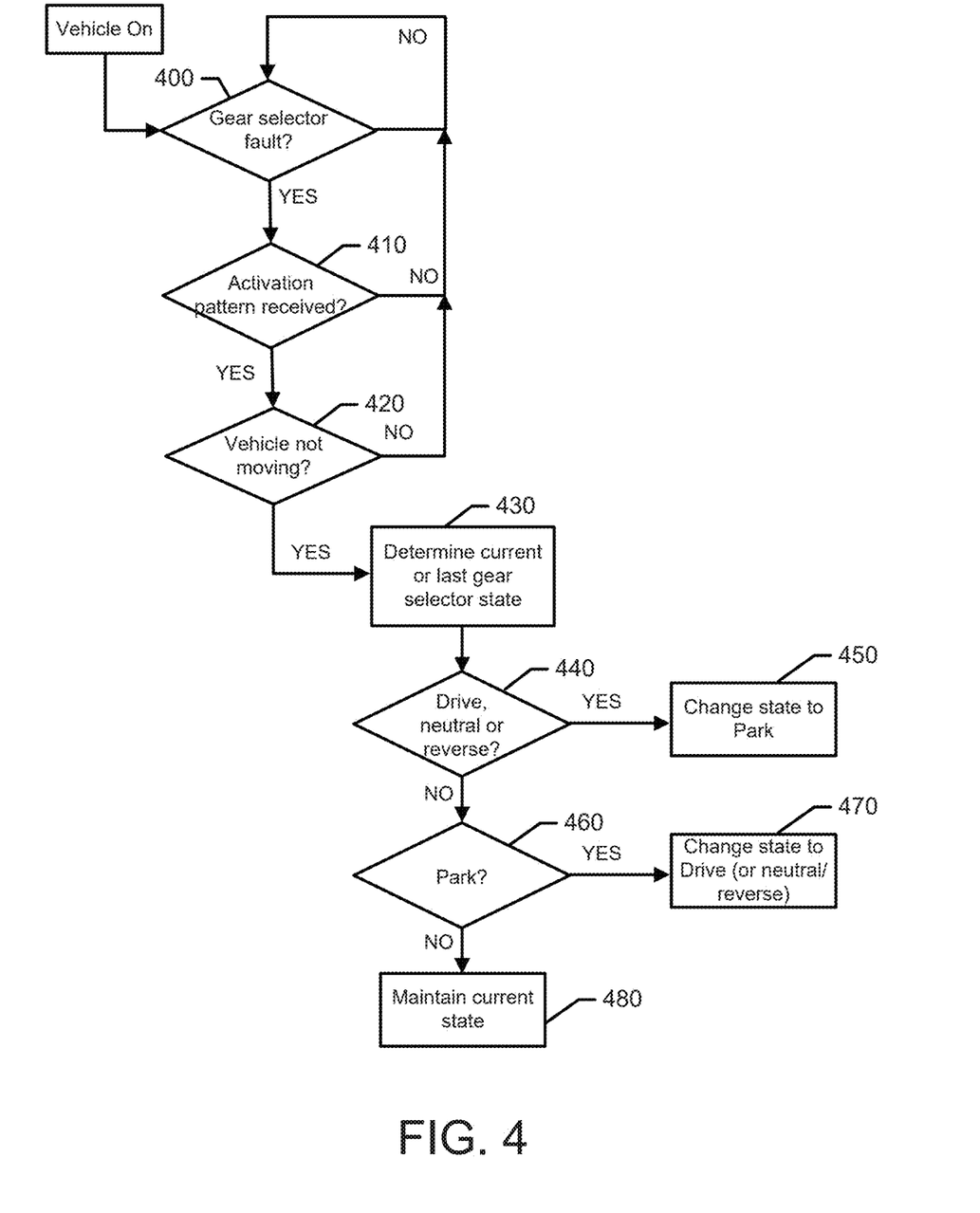
FIG. 4 illustrates a control flow diagram for controlling an alternative way to shift into or out of part with a faulted gear selector in accordance with an example embodiment.

FIG. 4 illustrates a control flow diagram to show how functionality of the park status backup controller 240 may be controlled or progress in an example embodiment. In this regard, control flow may begin with a determination as to whether the gear selector is faulted at operation 400. If not, a monitoring cycle for the faulted status may be repeated. If the fault is detected, then a determination may be made as to whether the activation pattern is received at operation 410. If not, the monitoring cycle may return to operation 400. If the activation pattern is received, then in some optional cases an additional determination may be made as to whether or not the vehicle is moving at operation 420. If not, again, the monitoring cycle may repeat as flow returns to operation 400. However, if the vehicle is also not moving then a determination may be made at operation 430 as to the last gear selector state (or current state) of the gear selector. If the last or current state is drive (or neutral or reverse) as determined at operation 440, then the state may be changed to the park state at operation 450. However, if the result of operation 440 is such that the current state was not drive (or neutral or reverse), then flow may proceed to operation 460 where it is determined as to whether the last or current state is the park state. If yes, then a change may be made to the drive state (or neutral or reverse) at operation 470. If no, then the current state may be maintained at operation 480 and, in some cases, flow may return to operation 400.

Notably, the activation table 254 may define different activation patterns for different outcomes. For example, three activations in rapid succession (e.g., less than two seconds) may shift to reverse, or seven activations in 12 seconds may shift to neutral. In short, the activation table 254, and the various states and transitions defined therein provide significant flexibility to designers to define state changes and corresponding triggers for such state changes.

Moreover, the activation table 254 may be updated (including wirelessly) to define different state changes over time. Thus, for example, a first activation pattern may correspond to a first operating state change instruction, a second activation pattern (different than the first) may correspond to a second operating state change instruction (different than the first), and so on, and so on.

Although not required, in some embodiments, the park status backup controller 240 may be provided at or as a portion of an electronic brake boost (EBB) module of the vehicle. However, the park status backup controller 240 may alternatively be a part of a vehicle control unit (VCU), electronic control unit (ECU), a standalone controller, or otherwise included in another system or as another function of a controller of another system in alternative embodiments.

Figure 5:
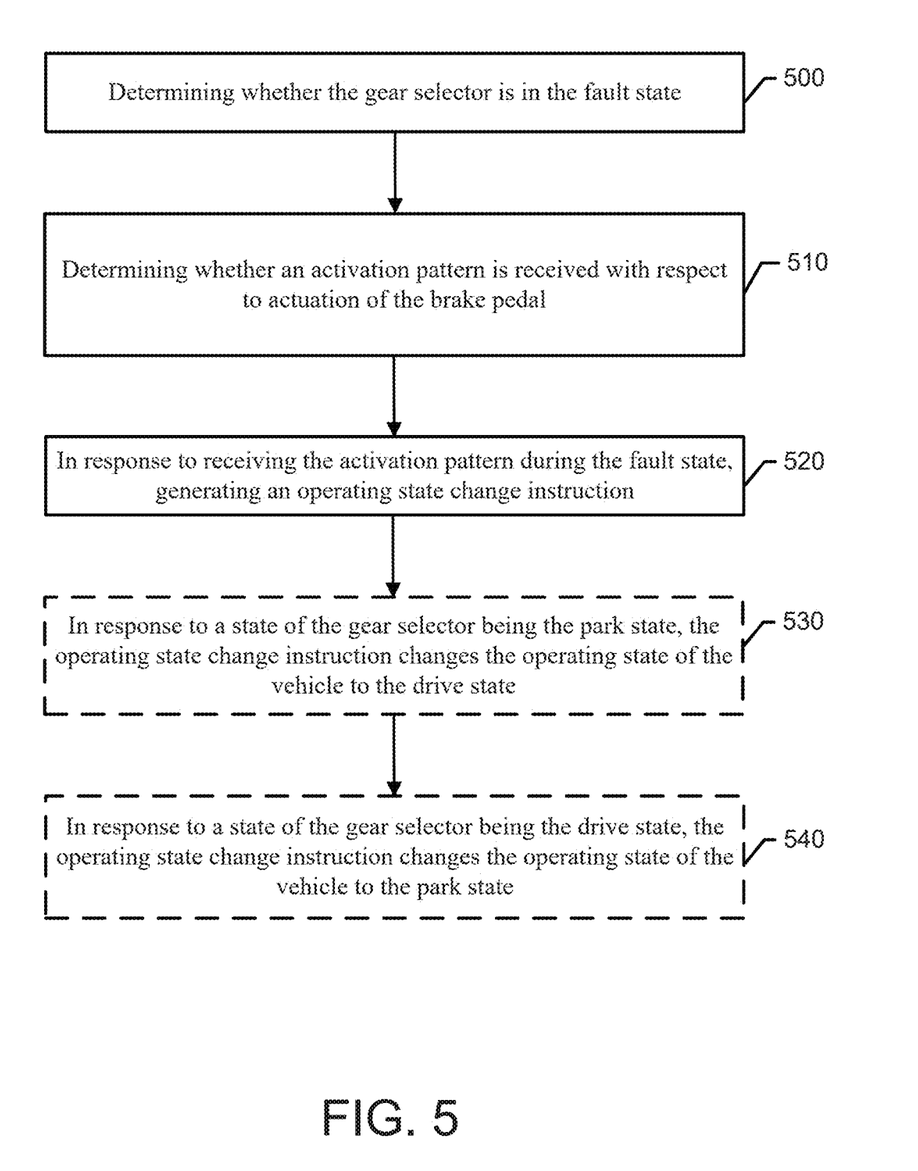
FIG. 5 illustrates a block diagram of a method for providing backup park status functionality in accordance with an example embodiment.

FIG. 5 illustrates a method of providing backup park status functionality in a vehicle braking system such as that shown, for example in FIG. 1. Thus, for example, the method may be practiced in a vehicle that includes a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state. The operating state may be a selected one of a group of states including a park state and a drive state. The braking system may apply a holding force to the wheel assembly in the park state and the propulsion system enabling application of the positive torque for propulsion in the drive state. The park status backup controller may be operably coupled to the brake pedal to detect actuation of the brake pedal, and operably coupled to the gear selector to receive information indicative of a fault state of the gear selector. The method may include determining whether the gear selector is in the fault state at operation 500, determining whether an activation pattern is received with respect to actuation of the brake pedal at operation 510, and, in response to receiving the activation pattern during the fault state, generating an operating state change instruction at operation 520. Additional optional operations that further augment or supplement operation 520 may include, in response to a state of the gear selector being the park state, the operating state change instruction changes the operating state of the vehicle to the drive state at operation 530 and, in response to a state of the gear selector being the drive state, the operating state change instruction changes the operating state of the vehicle to the park state at operation 540.

A vehicle control system for a vehicle may therefore be provided. The vehicle control system may include a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state. The operating state may be a selected one of a group of states including a park state and a drive state. The braking system may apply a holding force to the wheel assembly in the park state and the propulsion system enabling application of the positive torque for propulsion in the drive state. The vehicle control system may further include a park status backup controller operably coupled to the brake pedal to detect actuation of the brake pedal, and operably coupled to the gear selector to receive information indicative of a fault state of the gear selector. In response to receiving an activation pattern during the fault state, the park status backup controller may generate an operating state change instruction.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, in response to a state of the gear selector being the park state, the operating state change instruction may change the operating state of the vehicle to the drive state. Alternatively or additionally, in response to a state of the gear selector being the drive state, the operating state change instruction may change the operating state of the vehicle to the park state. In an example embodiment, in response to the operating change state instruction, a parking pawl of the transmission system or transaxle system is engaged or an electronic park brake (or service brake) of the brake system is applied. In some cases, the activation pattern may include at least a predetermined number of actuations of the brake pedal (e.g., five) within a predetermined period of time (e.g., 10 seconds). In an example embodiment, the park status backup controller may include an activation table defining a current status of the vehicle, and the operating state change instruction. In some cases, a sensor network of the vehicle may provide a movement indication to the park status backup controller, and the park status backup controller may remain inoperable unless the movement indication indicates that the vehicle is not moving.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A vehicle control system comprising:
    a braking system operably coupled to a wheel assembly to apply braking force to the wheel assembly when actuated responsive to operation of a brake pedal;
    a propulsion system operably coupled to the wheel assembly to apply positive torque for propulsion responsive to operation of an accelerator pedal;
    a gear selector operably coupled to the brake system and the propulsion system to select an operating state of the vehicle when the gear selector is in an unfaulted state, the operating state being a selected one of a group of states including a park state and a drive state, the braking system applying a holding force to the wheel assembly in the park state and the propulsion system enabling application of the positive torque for propulsion in the drive state; and
    a park status backup controller operably coupled to the brake pedal to detect actuation of the brake pedal, and operably coupled to the gear selector to receive information indicative of a fault state of the gear selector,
    wherein, in response to receiving an activation pattern during the fault state, the park status backup controller generates an operating state change instruction.

2. The vehicle control system of claim 1, wherein, in response to a state of the gear selector being the park state, the operating state change instruction changes the operating state of the vehicle to the drive state.

3. The vehicle control system of claim 1, wherein, in response to a state of the gear selector being the drive state, the operating state change instruction changes the operating state of the vehicle to the park state.

4. The vehicle control system of claim 1, wherein, in response to the operating change state instruction, a parking pawl of a transmission system is engaged.

5. The vehicle control system of claim 1, wherein, in response to the operating change state instruction, an electronic park brake or service brake of the brake system is applied.

6. The vehicle control system of claim 1, wherein the activation pattern comprises at least a predetermined number of actuations of the brake pedal within a predetermined period of time.

7. The vehicle control system of claim 6, wherein the predetermined number of actuations of the brake pedal is five, and
    wherein the predetermined period of time is 10 seconds.

8. The vehicle control system of claim 1, wherein the park status backup controller comprises an activation table defining a current status of the vehicle, and the operating state change instruction.

9. The vehicle control system of claim 1, wherein a sensor network of the vehicle provides a movement indication to the park status backup controller, and
    wherein the park status backup controller is inoperable unless the movement indication indicates that the vehicle is not moving.

10. A park status backup controller of a vehicle control system that includes a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state, wherein the operating state is a selected one of a group of states including a park state and a drive state, wherein the braking system applies a holding force to the wheel assembly in the park state and the propulsion system enabling application of the positive torque for propulsion in the drive state, wherein the park status backup controller is operably coupled to the brake pedal to detect actuation of the brake pedal, and operably coupled to the gear selector to receive information indicative of a fault state of the gear selector, and wherein the park status backup controller comprises processing circuitry configured to determine whether the gear selector is in the fault state;

determine whether an activation pattern is received with respect to actuation of the brake pedal; and in response to receiving the activation pattern during the fault state, generating an operating state change instruction.

11. The park status backup controller of claim 10, wherein, in response to a state of the gear selector being the park state, the operating state change instruction changes the operating state of the vehicle to the drive state.

12. The park status backup controller of claim 10, wherein, in response to a state of the gear selector being the drive state, the operating state change instruction changes the operating state of the vehicle to the park state.

13. The park status backup controller of claim 10, wherein, in response to the operating change state instruction, a parking pawl of a transmission system is engaged.

14. The park status backup controller of claim 10, wherein, in response to the operating change state instruction, an electronic park brake or service brake of the brake system is applied.

15. The park status backup controller of claim 10, wherein the activation pattern comprises at least a predetermined number of actuations of the brake pedal within a predetermined period of time.

16. The park status backup controller of claim 15, wherein the predetermined number of actuations of the brake pedal is five, and wherein the predetermined period of time is 10 seconds.

17. The park status backup controller of claim 10, wherein a memory of the processing circuitry stores an activation table defining a current status of the vehicle, and the operating state change instruction.

18. The park status backup controller of claim 10, wherein a sensor network of the vehicle provides a movement indication to the park status backup controller, and wherein the park status backup controller is inoperable unless the movement indication indicates that the vehicle is not moving.

19. A method of providing backup park status functionality in a vehicle comprising a braking system operably coupled to a wheel assembly to apply braking force to the wheel assembly when actuated responsive to operation of a brake pedal, a propulsion system operably coupled to the wheel assembly to apply positive torque for propulsion responsive to operation of an accelerator pedal, and a gear selector operably coupled to the brake system and the propulsion system to select an operating state of the vehicle when the gear selector is in an unfaulted state, wherein the operating state is a selected one of a group of states including a park state and a drive state, wherein the braking system applies a holding force to the wheel assembly in the park state and the propulsion system enabling application of the positive torque for propulsion in the drive state, and wherein the park status backup controller is operably coupled to the brake pedal to detect actuation of the brake pedal, and operably coupled to the gear selector to receive information indicative of a fault state of the gear selector, the method comprising:

determining whether the gear selector is in the fault state;

determining whether an activation pattern is received with respect to actuation of the brake pedal; and in response to receiving the activation pattern during the fault state, generating an operating state change instruction.

20. The method of claim 19, wherein, in response to a state of the gear selector being the park state, the operating state change instruction changes the operating state of the vehicle to the drive state, and wherein, in response to a state of the gear selector being the drive state, the operating state change instruction changes the operating state of the vehicle to the park state.

* * * * *